United States Patent
Naka

(10) Patent No.: US 9,210,329 B2
(45) Date of Patent: Dec. 8, 2015

(54) IMAGING APPARATUS HAVING FRAMING ASSIST CONTROL

(71) Applicant: CANON KABUSHIKI KAISHA, Tokyo (JP)

(72) Inventor: Yasutaka Naka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/498,929

(22) Filed: Sep. 26, 2014

(65) Prior Publication Data

US 2015/0015744 A1   Jan. 15, 2015

Related U.S. Application Data

(63) Continuation of application No. 13/196,253, filed on Aug. 2, 2011, now Pat. No. 8,872,943.

(30) Foreign Application Priority Data

Aug. 5, 2010   (JP) .................................. 2010-176136

(51) Int. Cl.
*H04N 5/262* (2006.01)
*H04N 5/232* (2006.01)

(52) U.S. Cl.
CPC ................................ *H04N 5/23296* (2013.01)

(58) Field of Classification Search
USPC .................. 348/240.99, 240.1–240.3, 220.1, 348/333.01–333.06; 396/72, 374
See application file for complete search history.

(56) References Cited

U.S. PATENT DOCUMENTS

| | | | |
|---|---|---|---|
| 8,403,573 B2 * | 3/2013 | Kim et al. ...................... 396/354 |
| 8,872,943 B2 * | 10/2014 | Naka ........................... 348/240.1 |
| 2007/0120988 A1 * | 5/2007 | Akiyama et al. ......... 348/240.99 |
| 2007/0296837 A1 * | 12/2007 | Morita ..................... 348/240.99 |
| 2010/0171870 A1 * | 7/2010 | Hongu .......................... 348/348 |

* cited by examiner

*Primary Examiner* — Kelly L Jerabek
(74) *Attorney, Agent, or Firm* — Canon USA Inc. IP Division

(57) ABSTRACT

In an imaging apparatus having framing assist control, a controller controls a change speed of the display angle of view changed by a second or a third instruction member faster than the change speed of the display angle of view changed by a first instruction member. The first instruction member is configured to issue an instruction regarding a change of a display angle of view and a change direction of the display angle of view. The second instruction member is configured to issue an instruction to change the display angle of view displayed on the monitor to a wide-angle side by a predetermined amount. The third instruction member is configured to issue an instruction to change the display angle of view displayed on the monitor to the display angle of view before the display angle of view is changed by the second instruction member.

26 Claims, 4 Drawing Sheets

FIG. 4

| No | OPERATION | STILL IMAGE MODE | MOVING IMAGE MODE |
|---|---|---|---|
| 1 | ZOOM LEVER OPERATION SMALL (V1) | LOW SPEED | EXTREMELY LOW SPEED |
| 2 | ZOOM LEVER OPERATION MEDIUM (V1) | MEDIUM SPEED | LOW SPEED |
| 3 | ZOOM LEVER OPERATION LARGE (V1) | HIGH SPEED | MEDIUM SPEED |
| 4 | FRAMING BUTTON ON (V2) | EXTREMELY HIGH SPEED | MEDIUM SPEED |
| 5 | FRAMING BUTTON OFF (V3) | HIGH SPEED | MEDIUM LOW SPEED |

IMAGING APPARATUS HAVING FRAMING ASSIST CONTROL

CROSS-REFERENCE TO RELATED APPLICATIONS

This application is a Continuation of co-pending U.S. patent application Ser. No. 13/196,253, filed Aug. 2, 2011, which claims foreign priority benefit of Japanese Patent Application No. 2010-176136 filed Aug. 5, 2010, both of which are hereby incorporated by reference herein in their entirety.

BACKGROUND OF THE INVENTION

1. Field of the Invention

The present invention relates to an imaging apparatus, such as a digital camera including an optical zoom function and an electronic zoom function.

2. Description of the Related Art

Conventionally, for the purpose of quickly capturing an image of an object and performing image processing, a camera system capable of performing quick and accurate adjustment of an angle of view by an operation of a zoom lever is required. Japanese Patent Application Laid-Open No. 2004-252370 discusses an improvement in operability of such a zoom lever operation by using a camera system that eliminates the need for fine adjustment of the angle of view which has been adjusted by the zoom lever or a zoom ring. According to the camera system, a user designates a region to be enlarged by a frame if the user desires to zoom-in. On the other hand, if the user desires to zoom back, the user determines the reduction ratio after confirming the reduced image. Then, the zooming is automatically performed according to a predetermined operation.

The zooming speed of the camera system discussed in Japanese Patent Application Laid-Open No. 2004-252370 can be set by the user to a desirable speed in advance of the operation. However, the setting method of the speed is not discussed in Japanese Patent Application Laid-Open No. 2004-252370.

Generally, the angle of view is difficult to adjust if a high power zoom lens is used since the camera shake has a significant effect on the imaging. Thus, the object may be frequently lost even if the angle of view is set. In such a situation, it is difficult to quickly change the angle of view to the wide-angle by the zoom lever and then change the angle of view back again after capturing the object.

On the other hand, if a framing button is provided in addition to the zoom lever, the user can easily perform the framing during the high zoom magnification imaging by pressing the framing button. When the framing button is pressed, the current zoom position is stored and the zoom is driven to a wide-angle position which is acquired based on the current zoom ratio. When, the user releases the framing button, the position is changed back to the stored zoom position. In the following description, this function is referred to as the "framing assist" function.

Unlike the operation by the zoom lever, the target zoom position of the framing assist function is determined before the drive. Thus, amiss operation such as overshooting does not occur even if the zooming is performed at a high speed. Accordingly, the zooming can be controlled at high speed. However, if the camera is in a moving image mode, unlike the angle of view adjustment of the imaging of a still image, the continuity of the recorded video image becomes important.

There are two types of operations concerning the zoom framing assist function. One function is used for driving the zoom in the wide-angle direction to capture the object in the angle of view. The other function is used for zooming in on the captured object. Since driving the zoom in the wide-angle direction (the former function) is used for capturing the object, high speed zooming in the wide-angle direction is required. In contrast, for zooming in on the captured object, a smooth operation is given priority in changing the angle of view rather than the speed of the operation with respect to the latter function so that the captured object is not lost.

SUMMARY OF THE INVENTION

The present invention is directed to an imaging apparatus that can control zooming at an optimum zoom speed appropriate for an operation in zoom imaging and improve the convenience for a user at high zoom magnification imaging.

According to an aspect of the present invention, an imaging apparatus includes a monitor configured to display an image, a first instruction member which is operable by a user and is configured to issue an instruction corresponding to a change of a display angle of view of the image displayed on the monitor and a change direction of the display angle of view, a second instruction member which is operable by the user and is configured to issue an instruction to change the display angle of view displayed on the monitor to a wide-angle side by a predetermined amount, a third instruction member which is operable by the user and is configured to issue an instruction to change the display angle of view displayed on the monitor to the display angle of view before the display angle of view is changed by the second instruction member, and a controller configured to control a change speed of the display angle of view changed by the second or the third instruction member faster than the change speed of the display angle of view changed by the first instruction member.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an example of a relation among an operation, an imaging mode, and a zoom control speed according to the exemplary embodiment.

DESCRIPTION OF THE EMBODIMENTS

Various exemplary embodiments, features, and aspects of the invention will be described in detail below with reference to the drawings.

Figure 1:
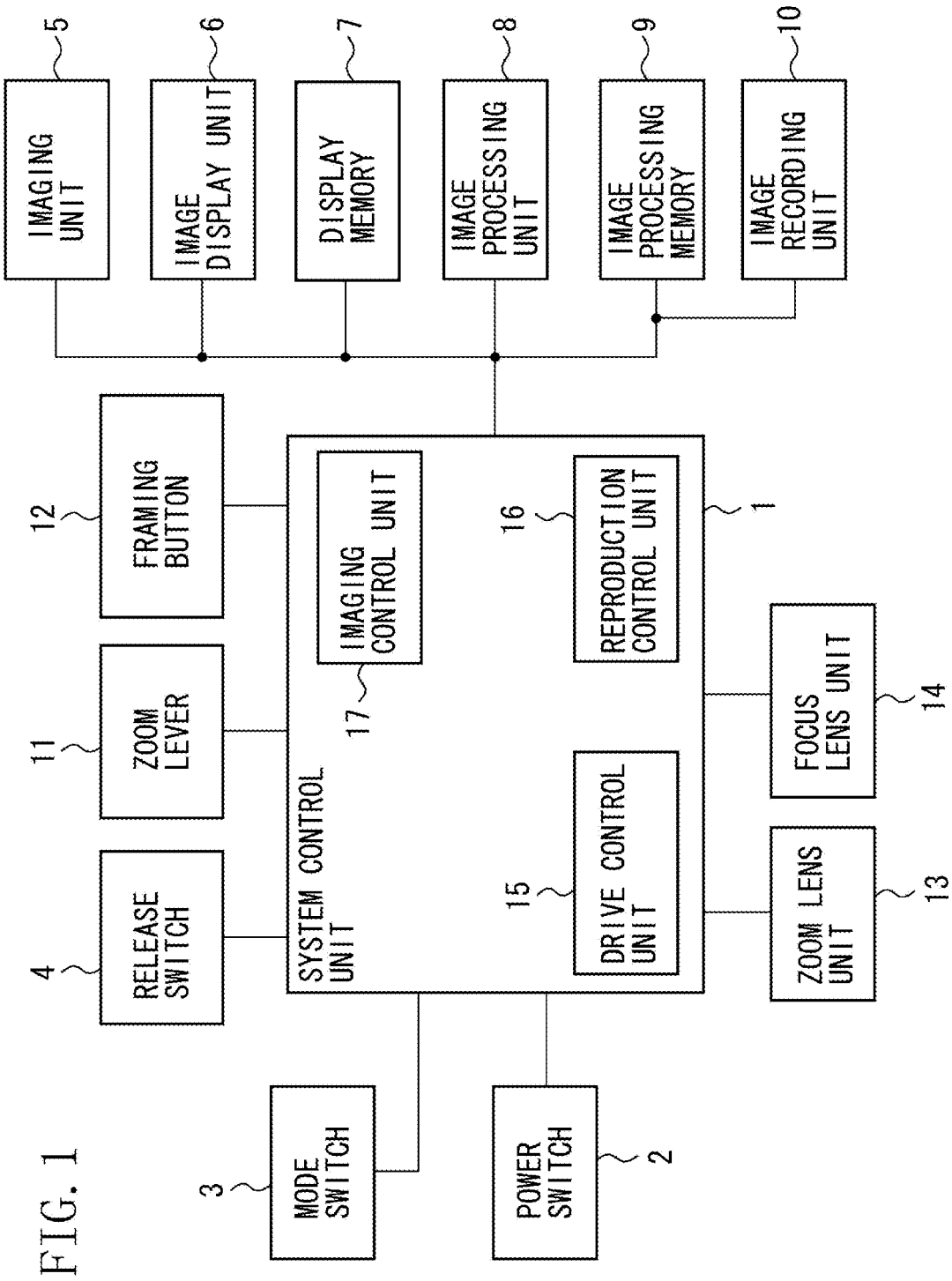
FIG. 1 illustrates a system configuration of an imaging apparatus according to an exemplary embodiment of the present invention.

FIG. 1 illustrates an example of a configuration of a digital camera as an exemplary embodiment of an imaging apparatus according to the present invention. A system control unit 1, such as a microprocessor, includes a built-in non-volatile memory or a removable non-volatile memory and executes a program recorded in the memory to realize the processing according to at least one of the exemplary embodiments described below. Further, the digital camera includes a network interface (I/F) (not shown) and can execute a program on a non-illustrated digital processor (server) residing in the network. Thus, at least part of the present invention may be implemented by executing a program on a network.

A power switch 2 is used for turning on/off the power of the digital camera. A mode switch 3 is used for changing imaging modes of the digital camera. Imaging modes include but are not limited to a still image mode, a moving image mode, and a reproduction mode. The still image mode and the moving image mode are used for processing imaging data and recording the obtained processed image in an image recording unit as a still image and a moving image, respectively. The reproduction mode is used for processing an image recorded in the image recording unit and outputting (displaying) the processed image onto an image output (display) unit. In the description below, the still image mode and the moving image mode are referred to as the imaging mode. A release switch 4 is used to instruct recording of the imaging data into the image recording unit in the imaging mode.

An imaging unit 5 performs analog-to-digital (AD) conversion on an image signal exposed by a non-illustrated image sensor and outputs the converted signal. An image display unit 6 serves as a monitor to display (reproduce) the image data stored in a display memory 7 on a display device such as a liquid crystal display (LCD).

An image processing unit 8 performs compression and expansion processing or development processing on the imaging data obtained by the imaging unit 5 or the image data recorded in the image recording unit 10. An image processing memory 9 is used when the image processing unit 8 performs image processing.

An image recording unit 10 records the image data which has been captured. A zoom lever 11 is used for changing a drive direction or a speed of an optical zoom and an electronic zoom according to its operation direction or the amount of operation. A framing button 12 is used for temporarily driving the zoom to a wide-angle direction. The framing button 12 is pressed when the object is lost during the zoom. A zoom lens unit 13 and a focus lens unit 14 include a drive motor.

The portions related to the present exemplary embodiment included in the control block of the system control unit 1 will be described. The system control unit 1 includes a drive control unit 15, a reproduction control unit 16, and an imaging control unit 17 all of which operate according to various switch operations and control programs executed by the system control unit 1. The imaging control unit 17 performs control of the imaging processing sequence when the camera is in the imaging mode. The reproduction control unit 16 performs control of the image reproduction processing sequence when the camera is in the reproduction mode. The drive control unit 15 performs control of the drive sequence of the zoom lens unit 13, the focus lens unit 14, and so on.

The imaging mode of the present exemplary embodiment is used not only for recording an image but also for executing a through display function which is a function for displaying an image captured by the imaging unit 5 on the image display unit 6 in real time (e.g., in preview mode). In addition to the optical zoom function for driving the zoom lens, the imaging mode includes the electronic zoom function for clipping a portion of the captured image and displaying an enlarged image of the clipped image.

Figure 2:
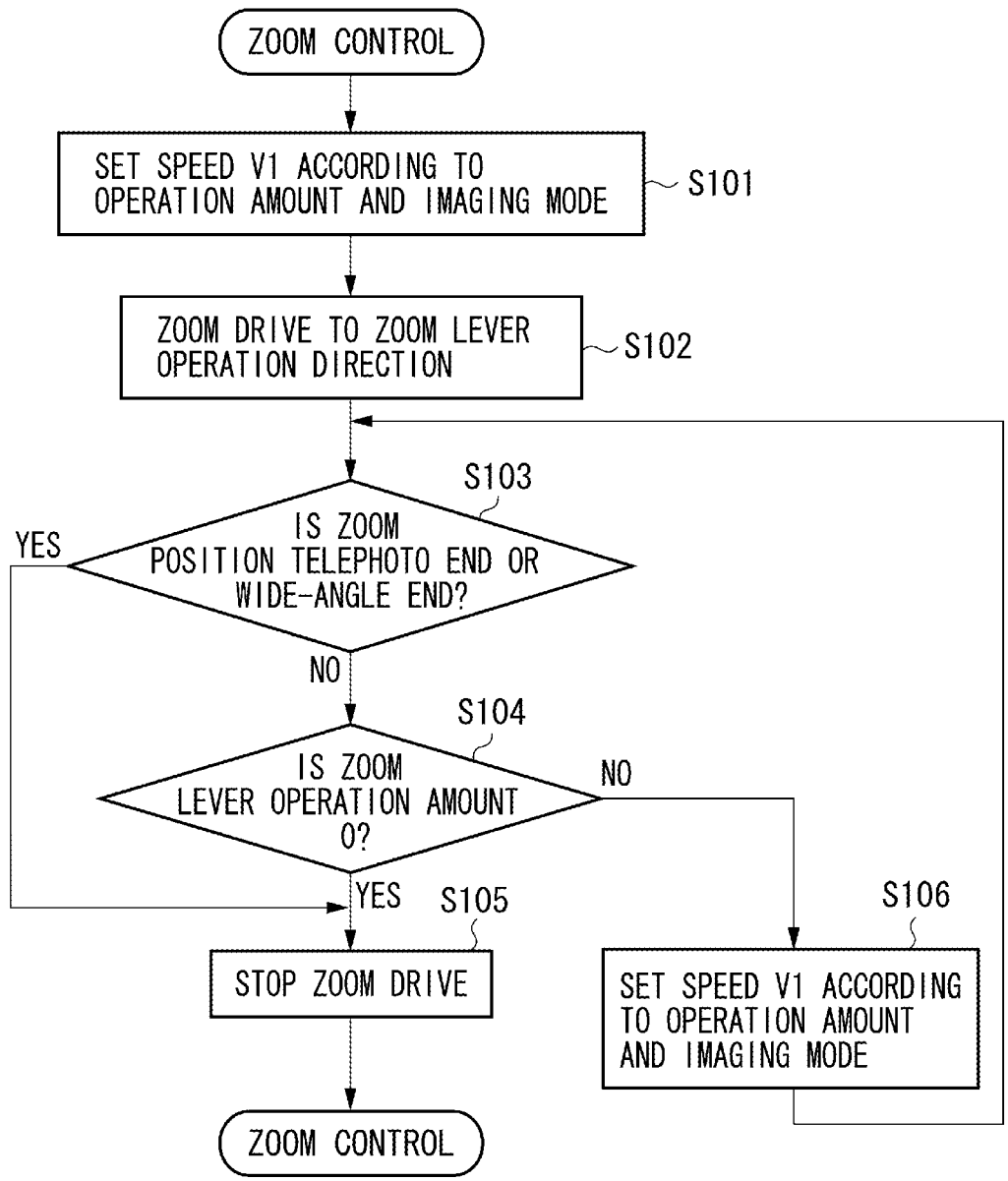
FIG. 2 is a flowchart illustrating zoom control performed by a zoom lever operation according to the exemplary embodiment.
Figure 3:
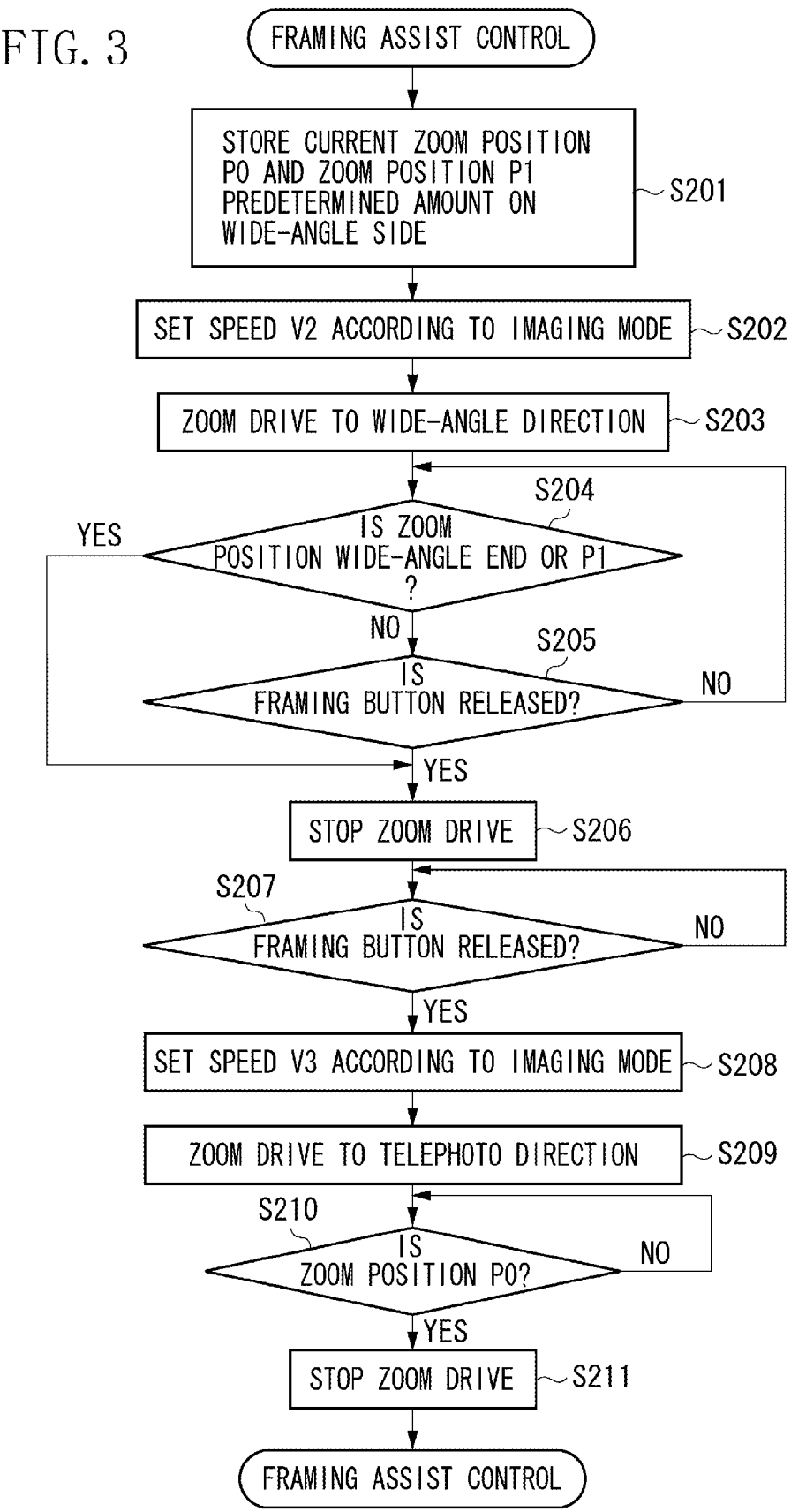
FIG. 3 is a flowchart illustrating framing assist control according to the exemplary embodiment.

The operation according to the exemplary embodiment of the present invention will be described below with reference to FIGS. 2 to 4.

According to the present exemplary embodiment, the zoom lens control performed by the drive control unit 15 and the electronic zoom control performed by the imaging control unit 17 are not differentiated and referred to as the zoom control in the description below.

If the zoom lever 11 is operated, the system control unit 1 performs the zoom control based on the operation direction and the amount of operation of the zoom lever 11. FIG. 2 is a flowchart illustrating the zoom control operation.

The zoom control performed according to the zoom lever operation will be described with reference to FIG. 2. In step S101, the system control unit 1 determines a zoom control speed V1 (hereinafter referred to as the speed V1) according to the imaging mode and the amount of operation of the zoom lever 11. In step S102, the system control unit 1 starts the zoom drive in the direction corresponding to the zoom lever operation direction at the speed V1. Specifically, as illustrated in FIG. 4 (rows No. 1-3), when the imaging mode is a still image mode and the zoom lever operation amount is small, the system control unit 1 performs the zoom drive in the direction corresponding to the zoom lever operation direction at a LOW speed V1. Alternatively, when the imaging mode is a moving image mode and the zoom lever operation amount is small, the system control unit 1 performs the zoom drive in the direction corresponding to the zoom lever operation direction at an EXTREMELY LOW speed V1. Similar operations occur at step S102 when the zoom lever operation amount is medium and large, respectively. Accordingly, it can be seen from FIG. 4, that when the imaging mode is a still image mode, the system control unit 1 performs the zoom drive corresponding to the zoom lever operation amount a speed V1 higher than a speed V1 when the imaging mode is a moving image mode.

In step S103, the system control unit 1 determines whether the zoom position is at the telephoto end or at the wide-angle end of the drive direction. If the zoom position reaches the telephoto end or the wide-angle end (YES in step S103), the processing proceeds to step S105. If the zoom position is neither at the telephoto end nor at the wide-angle end (NO in step S103), and further it is determined that the zoom lever operation is stopped (YES in step S104), the processing proceeds to step S105. In step S105, the system control unit 1 stops the zoom drive. On the other hand, if the zoom position is anywhere between the telephoto end the wide-angle end (NO in step S103) and the zoom lever operation is determined to be active (NO in step S104), then in step S106, the system control unit 1 performs the zoom drive while changing the speed V1 according to the change in the operation amount of the zoom lever.

If the user presses (turns ON) the framing button 12, the system control unit 1 performs the framing assist control. FIG. 3 is a flowchart illustrating the framing assist control.

The framing assist control will be described below with reference to FIG. 3. In step S201, when the framing button 12 is pressed (turned ON), the system control unit 1 stores a current zoom position P0 (the zoom position when the framing button 12 is pressed) in the memory, acquires a zoom position P1 corresponding to a focal length which is a predetermined amount shorter than the focal length of the current zoom position P0 (in other words, a position a predetermined amount on the wide-angle end side), and stores the zoom position P1 in the memory.

In step S202, the system control unit 1 determines a speed V2 according to whether the imaging mode is the still image mode or the moving image mode. In step S203, the system control unit 1 performs the zoom drive to the wide-angle direction at the speed V2 set in step S202. Specifically, as illustrated in FIG. 4 (row No. 4), when the framing button is ON and the imaging mode is the still image mode, the system control unit 1 performs the zoom drive to the wide-angle direction at the speed V2 (extremely high speed), which is the highest speed available for zoom drive. Alternatively, when the framing button is ON and the imaging mode is the moving image mode, the system control unit 1 performs the zoom drive to the wide-angle direction at the speed V2 (medium speed), which is lower than the highest speed available for zoom drive.

In step S204, the system control unit 1 determines whether the zoom position is at the zoom position P1 or at the wide-angle end. If the zoom position is either at the wide-angle end or at the zoom position P1 (YES at step S204), the process advances to step S206. If the zoom position is neither at the wide-angle end nor at the zoom position 1 (NO at step S204), the process advances to step S205.

In step S205, the system control unit 1 determines whether the framing button 12 is released (turned OFF) during the zoom drive. If the framing button is released (YES in step S205), the processing proceeds to step S206. If the framing button is not released (NO in step S205), the system control unit 1 continues the zoom drive to the wide-angle direction, and again determines whether the zoom position is at the zoom position P1 or at the wide-angle end in step S204.

In step S206, once the zoom position reaches one of the wide-angle end and the zoom position P1 or when the framing button is released, the system control unit 1 stops the zoom drive. The zoom stop position at that time (step S206) will be either the zoom position P1 or the wide-angle end. In other words, when the framing button is released, the system control unit 1 stops the zoom drive after returning the zoom to zoom position P1. That is, when, the user releases the framing button, the position is changed back to the stored zoom position P1.

In step S207, the system control unit 1 determines whether the framing button 12 is released (turned OFF). If the framing button 12 is released (YES in step S207), the processing proceeds to step S208. In step S208, the system control unit 1 determines a speed V3 according to whether the imaging mode is the still image mode or the moving image mode.

In step S209, the system control unit 1 performs the zoom drive in the telephoto direction to the zoom position P0 that is the position before the driving by the "ON" operation of the framing button 12. At this point it is determined in step S210 that the zoom position is at the zoom position P0.

An example of the relations among the zoom control speeds V1, V2, and V3 which are the key point of the present exemplary embodiment will be described below with reference to FIG. 4.

In FIG. 4, Nos. 1 to 3 illustrate speeds used as the zoom control speed V1 when the zoom lever is operated. No. 4 illustrates the zoom control speed V2 when the zoom is driven in the wide-angle direction when the framing button 12 is pressed (turned ON). No. 5 illustrates the zoom control speed V3 when the zoom is driven back to the position P0 of the zoom (stored before the framing button has been pressed), upon the release (OFF) of the framing button 12.

According to the framing assist control, at the time the framing button 12 is pressed and the operation is started, a target value which is a predetermined value on the wide-angle side is set. Thus, the user does not need to care about miss operation such as overshooting. Accordingly, an extremely high speed, which is faster than the zoom control speed realized by the operation of the zoom lever, can be set as illustrated in No. 4. In this way, when the zooming is controlled by the framing button 12, the speed V2 faster than the high zoom speed in the range of the zoom control speed V1 when the zooming is executed according to the zoom lever 11 can be set to control the zoom. Thus, the object of interest can be quickly captured.

Accordingly, the lost object can be quickly captured in the angle of view. Further, when the imaging mode is the moving image mode and the zoom is controlled by the framing button 12, a speed equal to the maximum zoom control speed according to the zoom lever 11 will be used. In this manner, continuity of the moving image to be recorded can be maintained.

Further, as illustrated in No. 5, when the captured object is zoomed-in according to the release of the framing button (OFF), the zoom drive is performed by a speed slower than the speed which is used when the zooming is driven in the wide-angle direction according to the pressing of the framing button. Thus, once the object is captured, the object will not be lost due to abrupt change in the angle of view.

Although the optical zoom which realizes the zoom operation by driving the zoom lens and the electronic zoom which realizes the zoom by enlarging a clipped region of the image are not distinguished in the description above, if the zoom speeds of the optical zoom control and the electronic zoom control are different, there will be no problem.

According to the present exemplary embodiment, the still image mode and the moving image mode are described separately. In recent years, there are cameras which can record a moving image in the still image mode. If such cameras are used, the mode which is used when the moving image is recorded will correspond to the moving image mode of the present exemplary embodiment.

According to the present exemplary embodiment, the zoom lever 11 is used as a first instruction member of the present invention. Further, the framing button 12 to be turned on is used as a second instruction member and the framing button 12 to be turned off is used as a third instruction member of the present invention. However, the operation members of the present invention are not limited to such members and operation members of any form can be used.

The exemplary embodiments of the present invention are not limited to the above-described embodiments and various modifications and changes can be implemented so long as they are within the scope of the present invention.

For example, the angle of view of the above-described embodiment is changed by controlling the zoom lens unit 13. The change of the angle of view can also be realized by the electronic zoom.

According to the present invention, the zoom can be controlled in an optimum zoom speed according to an operation to be performed in the zoom imaging. Thus, the user convenience can be enhanced when the user performs the high zoom magnification imaging.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A zoom control apparatus including a monitor controller configured to control a monitor to display an image, the apparatus comprising:

a first zooming controller which is configured to change an angle of view of the image displayed on the monitor based on a user operation of a first operation member; and a second zooming controller which is configured to change the angle of view of the image displayed on the monitor by changing a zoom position to a wide-angle side by a predetermined amount, wherein the change of the angle of view by the second zooming controller is performed according to a user operation of a second operation member different from the first operation member, wherein a change speed of the angle of view changed by the second zooming controller is faster than a change speed of the angle of view changed by the first zooming controller.

2. The zoom control apparatus according to claim 1, wherein the second zooming controller is configured to, when the zoom position is changed to the wide-angle side, change the angle of view displayed on the monitor to a telephoto side by the predetermined amount based on the user operation of the second operation member.

3. The zoom control apparatus according to claim 2, wherein the change to the telephoto side by the second zooming controller is a change of the zoom position to a previous zoom position before the change of the angle of view to the wide-angle side.

4. The zoom control apparatus according to claim 2, wherein the second zooming controller is configured to control the change speed of the angle of view changed to the wide-angle side faster than the change speed of the angle of view changed to the telephoto side.

5. The imaging apparatus according to claim 1, wherein a stop position of the angle of view when the angle of view is changed by the second zooming controller is changed according to the angle of view when an instruction is issued to change the angle of view.

6. The imaging apparatus according to claim 1, wherein the predetermined amount is changed according to the change speed when an instruction is issued to change the angle of view.

7. The imaging apparatus according to claim 1, further comprising:
an imaging mode selection unit configured to select one of a still image mode and a moving image mode,
wherein the second zooming controller is configured to control a speed at which the angle of view is changed to wide-angle side by the predetermined amount in the moving image mode to be equal to the maximum speed at which the angle of view is changed by the first zooming controller.

8. The imaging apparatus according to claim 1, further comprising:
an imaging mode selection unit configured to select one of a still image mode and a moving image mode,
wherein the second zooming controller is configured to control a speed at which the angle of view is changed to wide-angle side by the predetermined amount in the still image mode to be faster than a speed at which the angle of view is changed to wide-angle side by the predetermined amount in the moving image mode.

9. The imaging apparatus according to claim 1, further comprising:
an imaging mode selection unit configured to select one of a still image mode and a moving image mode,
wherein the second zooming controller is configured to control a speed at which the angle of view is changed to telephoto side by the predetermined amount in the still image mode to be faster than a speed at which the angle of view is changed to telephoto side by the predetermined amount in the moving image mode.

10. The imaging apparatus according to claim 1, further comprising:
an imaging mode selection unit configured to select one of a still image mode and a moving image mode,
wherein, when the imaging mode selection unit selects the still image mode, the second zooming controller controls a speed at which the angle of view is changed to the wide-angle side by the predetermined amount to be faster than a speed at which the angle of view is changed to the wide-angle side by the predetermined amount in the moving image mode.

11. The zoom control apparatus according to claim 1, wherein the first operation member includes a zoom operation member, and
wherein the second operation member includes a frame assist operation member.

12. The zoom control apparatus according to claim 1, wherein, in response to the user operation of the second operation member, the second zooming controller is configured to change the angle of view of the image displayed on the monitor by changing the zoom position to the wide-angle side by the predetermined amount, and
wherein, after the user operation of the second operation member, the second zooming controller is configured to change the angle of view of the image displayed on the monitor by changing the zoom position to a telephoto side by the predetermined amount.

13. The zoom control apparatus according to claim 1, wherein the predetermined amount is one of a focal distance and a speed of change of the angle of view.

14. A method of controlling an imaging apparatus including a monitor controller configured to control a monitor to display an image, the method comprising:
causing a first zooming controller to change an angle of view of the image displayed on the monitor based on a user operation of a first operation member; and
causing a second zooming controller to change the angle of view of the image displayed on the monitor by changing a zoom position to a wide-angle side by a predetermined amount, wherein the change of the angle of view by the second zooming controller is performed according to a user operation of a second operation member different from the first operation member,
wherein a change speed of the angle of view changed by the second zooming controller is faster than a change speed of the angle of view changed by the first zooming controller.

15. A zoom control apparatus, comprising:
an imaging mode selection unit configured to select one of a still image recording mode and a moving image recording mode,
a first zooming controller which is configured to zoom an image based on a user operation with a first operation member; and
a second zooming controller which is configured to zoom out an image in a predetermined amount, wherein the zooming by the second zooming controller is performed according to a user operation with a second operation member different from the first operation member,
wherein a zooming speed by the second zooming controller is faster than a zooming speed by the first zooming controller, and wherein the second zooming controller is configured to control a zooming out speed in the still image recording mode to be faster than a zooming out speed in the moving image recording mode.

16. The zoom control apparatus according to claim 15, wherein the second zooming controller is configured to zoom out an image by the predetermined amount and thereafter zoom in an image by the predetermined amount based on respective user operation with the second operation member.

17. The zoom control apparatus according to claim 16, wherein the zooming out by the second zooming controller starts from a first zoom position and the zooming in by the second zooming controller is for returning to the first zoom position.

18. The imaging apparatus according to claim 17, wherein the predetermined amount is changed according to the first zoom position.

19. The zoom control apparatus according to claim 16, wherein the second zooming controller is configured to zoom out faster than to zoom in.

20. The imaging apparatus according to claim 15, further comprising:
wherein, in the moving image recording mode, the second zooming controller is configured to zoom out in a maximum speed of the zooming out speed by the first zooming controller.

21. The imaging apparatus according to claim 15, further comprising:
wherein the second zooming controller is configured to control a zooming in speed in the still image recording mode to be faster than a zooming in speed in the moving image recording mode.

22. The imaging apparatus according to claim 15, further comprising:
wherein, in the still image mode, the second zooming controller controls a zooming out speed to be faster than a zooming out speed in the moving image recording mode.

23. The zoom control apparatus according to claim 15,
wherein the first operation member includes a zoom operation member, and
wherein the second operation member includes a frame assist operation member.

24. The zoom control apparatus according to claim 15,
wherein, in response to the user operation of the second operation member, the second zooming controller is configured to change the angle of view of the image displayed on the monitor by changing the zoom position to the wide-angle side by the predetermined amount, and
wherein, after the user operation of the second operation member, the second zooming controller is configured to zoom by changing the zoom position to a telephoto side by the predetermined amount.

25. The zoom control apparatus according to claim 15,
wherein the predetermined amount is one of a focal distance and a speed of change of the angle of view.

26. A method of controlling an imaging apparatus having an imaging mode selection unit configured to select one of a still image recording mode and a moving image recording mode, the method comprising:
causing a first zooming controller to zoom an image based on a user operation with a first operation member; and
causing a second zooming controller to zoom out an image in a predetermined amount, wherein the zooming by the second zooming controller is performed according to a user operation with a second operation member different from the first operation member,
wherein a zooming speed by the second zooming controller is faster than a zooming speed by the first zooming controller, and
wherein causing the second zooming controller to zoom out an image in a predetermined amount includes causing the second zooming controller to control a zooming out speed in the still image recording mode to be faster than a zooming out speed in the moving image recording mode.

* * * * *